(12) United States Patent
Kwon et al.

(10) Patent No.: US 11,016,715 B2
(45) Date of Patent: May 25, 2021

(54) ELECTRONIC DEVICE AND METHOD FOR CONTROLLING THE SAME TO MIRROR A SCREEN OF THE ELECTRONIC DEVICE ON AN EXTERNAL DEVICE

(71) Applicant: SAMSUNG ELECTRONICS CO., LTD., Suwon-si (KR)

(72) Inventors: Jina Kwon, Suwon-si (KR); Junsik Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/588,228

(22) Filed: Sep. 30, 2019

(65) Prior Publication Data

US 2020/0379707 A1 Dec. 3, 2020

(30) Foreign Application Priority Data

May 27, 2019 (KR) .......................... 10-2019-0062119

(51) Int. Cl.
*G09G 5/00* (2006.01)
*G06F 3/14* (2006.01)
*H04N 5/262* (2006.01)

(52) U.S. Cl.
CPC .......... *G06F 3/1454* (2013.01); *G06F 3/1431* (2013.01); *H04N 5/2628* (2013.01)

(58) Field of Classification Search
CPC .... G06F 3/1454; G06F 3/1431; H04N 5/2628
USPC ......................................................... 345/2.2
See application file for complete search history.

(56) References Cited

U.S. PATENT DOCUMENTS

| 9,972,239 | B2 | 5/2018 | Trachtenberg et al. |
| 2010/0214278 | A1* | 8/2010 | Miura .................... G06F 1/3265 345/212 |
| 2011/0169728 | A1 | 7/2011 | Huang |
| 2013/0109371 | A1* | 5/2013 | Brogan ................. G06F 1/1626 455/420 |

(Continued)

FOREIGN PATENT DOCUMENTS

CN 105068774 A 11/2015
EP 2869188 A1 5/2015

(Continued)

OTHER PUBLICATIONS

Communication dated Mar. 19, 2020 issued by the European Patent Office in European Application No. 19200588.2.

(Continued)

*Primary Examiner* — Jonathan M Blancha
(74) *Attorney, Agent, or Firm* — Sughrue Mion, PLLC

(57) ABSTRACT

An electronic device and a control method thereof are provided. The electronic device includes: a display; a communicator; and a processor configured to execute instructions to: control the communicator to mirror, to an external device, a first screen provided by a first application corresponding to a user command, among a plurality of applications providing a plurality of screens, based on the user command for selectively mirroring one of the plurality of screens being input in a state in which the plurality of screens are displayed on the display, and control the display to display a second screen provided by a second application that is not mirrored to the external device, among the plurality of applications, while mirroring the first screen provided by the first application to the external device.

18 Claims, 15 Drawing Sheets

(56) References Cited

U.S. PATENT DOCUMENTS

| | | | | |
|---|---|---|---|---|
| 2013/0278484 A1* | 10/2013 | Hwang | ................ | G06F 3/1423 |
| | | | | 345/2.3 |
| 2014/0282074 A1* | 9/2014 | Laukkanen | ........... | G06F 3/0482 |
| | | | | 715/750 |
| 2014/0358981 A1* | 12/2014 | Miyake | ............... | H04L 67/1095 |
| | | | | 709/201 |
| 2015/0065056 A1* | 3/2015 | Won | .................... | H04M 1/7253 |
| | | | | 455/41.3 |
| 2015/0082241 A1 | 3/2015 | Kang et al. | | |
| 2015/0120817 A1* | 4/2015 | Jeong | ....................... | H04L 67/10 |
| | | | | 709/203 |
| 2015/0193187 A1* | 7/2015 | Kimn | ..................... | G09G 5/006 |
| | | | | 345/1.2 |
| 2016/0253142 A1 | 9/2016 | Choi et al. | | |
| 2017/0060518 A1 | 3/2017 | Hong et al. | | |
| 2018/0336373 A1* | 11/2018 | Deenadayal | ............ | G06F 21/84 |

FOREIGN PATENT DOCUMENTS

| | | |
|---|---|---|
| KR | 10-2011-0107058 A | 9/2011 |
| KR | 10-2011-0122556 A | 11/2011 |
| KR | 10-2014-0140720 A | 12/2014 |
| KR | 10-2015-0073573 A | 7/2015 |
| KR | 10-2015-0076701 A | 7/2015 |

OTHER PUBLICATIONS

Communication dated Dec. 16, 2019 issued by the European Patent Office in European Application No. 19200588.2.

International Search Report and Written Opinion (PCT/ISA/210 & PCT/ISA/237) dated Feb. 26, 2020 issued by the International Searching Authority in Application No. PCT/KR2019/012693.

Anonymous, "View a video from a mobile on an iPad by mirroring using a MediaServer", Jan. 20, 2018, retrieved from: http://blog.naver.com/PostView.nhn?blogId=backboys1003&logNo=221189129354, (24 pages total).

Communication dated Aug. 17, 2020 issued by the European Patent Office in European Application No. 20185347.0.

Communication dated Nov. 18, 2020, issued by the European Patent Office in European Application No. 20185347.0.

* cited by examiner

ELECTRONIC DEVICE AND METHOD FOR CONTROLLING THE SAME TO MIRROR A SCREEN OF THE ELECTRONIC DEVICE ON AN EXTERNAL DEVICE

CROSS-REFERENCE TO RELATED APPLICATION(S)

This application is based on and claims priority under 35 U.S.C. § 119 to Korean Patent Application No. 10-2019-0062119, filed on May 27, 2019, in the Korean Intellectual Property Office, the disclosure of which is incorporated by reference herein in its entirety.

BACKGROUND

1. Field

The disclosure relates to an electronic device and a method for controlling the same, and more particularly, to an electronic device performing a mirroring and a method for controlling the same.

2. Description of the Related Art

With the evolution of electronic technology, various electronic devices have recently been developed. In particular, an electronic device supporting a mirroring service has recently been developed.

The mirroring service refers to a service for displaying (or sharing) an image that is being displayed on a display of the electronic device, on a display of another electronic device. Thus, the mirroring service allows a user to watch an image that is being displayed on a display of an electronic device such as a notebook, a tablet, or a smartphone, through a display of a display device such as a television or a monitor.

The user may want to execute an application such as a news application or a chatting application through the electronic device while watching the moving image (e.g., a sports image provided by a video watching application or the like) mirrored by the electronic device through the display of the other electronic device.

A related art electronic device, however, mirrors an image provided by an application currently executed in the electronic device to the other electronic device. In this case, the image provided by the application currently executed in the electronic device is displayed on the display of the other electronic device instead of the moving image (e.g., sports image).

SUMMARY

Provided are an electronic device capable of displaying an image provided by an application different from a specific application while an image provided by the specific application is mirrored to the other electronic device, and a method for controlling the same.

Additional aspects will be set forth in part in the description which follows and, in part, will be apparent from the description, or may be learned by practice of the presented embodiments.

According to an aspect of the disclosure, an electronic device includes: a display; a communicator; and a display; a communicator; and a processor configured to execute instructions to: control the communicator to mirror, to an external device, a first screen provided by a first application corresponding to a user command, among a plurality of applications providing a plurality of screens, based on the user command for selectively mirroring one of the plurality of screens being input in a state in which the plurality of screens are displayed on the display, and control the display to display a second screen provided by a second application that is not mirrored to the external device, among the plurality of applications, while mirroring the first screen provided by the first application to the external device.

The processor may be further configured to execute the instructions to control the first screen mirrored, to the external device, based on another user command received while the first screen is being mirrored to the external device.

The processor may be further configured to control the communicator to transmit, to the external device, information on a resolution of the first screen based on the user command for mirroring one of the plurality of screens being input, in order to cause an orientation of a rotatable display of the external device to be arranged based on the information on the resolution.

The information on the resolution may cause the first screen mirrored to the external device to be displayed on the rotatable display of the external device in a landscape state when the rotatable display of the external device is in the landscape state and a width of the first screen is greater than a height of the first screen, and may cause the first screen mirrored to the external device to be displayed in the landscape state after the rotatable display of the external device in a portrait state is rotated to the landscape state and when the rotatable display of the external device is in the portrait state and the width of the first screen is greater than the height of the first screen.

The information on the resolution may cause the first screen mirrored to the external device to be displayed on the rotatable display of the external device in a portrait state when the rotatable display of the external device is in the portrait state and a height of the first screen is greater than a width of the first screen, and may cause the first screen mirrored to the external device to be displayed in a landscape state after the rotatable display of the external device in the landscape state is rotated to the portrait state and when the rotatable display of the external device is in the landscape state and the height of the first screen is greater than the width of the first screen.

The processor may be further configured to execute the instructions to control to reduce a size of the first screen displayed on the display and provided by the first application, based on the mirroring of the first screen to the external device.

The processor may be further configured to execute the instructions to control to enlarge a size of the second screen that is not mirrored so that the second screen that is not mirrored is displayed on at least a portion of an area where the first screen was displayed on the display before being reduced, based on the reducing of the size of the first screen.

The processor may be further configured to execute the instructions to control to display the first screen on the display to be darker than before the mirroring.

The processor may be further configured to execute the instructions to control to replace, on the display, the first screen with information on an image included in the first screen mirrored to the external device.

The processor may be further configured to execute the instructions to: control to display a menu for setting a mirroring area on the display, based on a signal for mirroring an external device screen being received from the external device in a state in which the second screen provided by the second application is displayed on the display; and control to display the external device screen mirrored from the external device on a first area and display the second screen provided by the second application on a second area different from the first area, based on the first area being set as the mirroring area according to a user command for manipulating the menu.

According to another aspect of the disclosure, a method for controlling an electronic device includes: mirroring, to an external device, a first screen provided by a first application corresponding to a user command, among a plurality of applications providing a plurality of screens, based on the user command for selectively mirroring one of the plurality of screens being input in a state in which the plurality of screens are displayed on a display; and displaying a second screen provided by a second application that is not mirrored to the external device, among the plurality of applications, while mirroring the first screen provided by the first application to the external device.

The method may further include controlling the first screen mirrored, to the external device, based on another user command received while the first screen is being mirrored to the external device.

The method may further include transmitting, to the external device, information on a resolution of the first screen based on the user command for mirroring one of the plurality of screens being input, in order to cause an orientation of a rotatable display of the external device to be arranged based on the information on the resolution.

The information on the resolution may cause the first screen mirrored to the external device to be displayed on the rotatable display of the external device in a landscape state when the rotatable display of the external device is in the landscape state and a width of the first screen is greater than a height of the first screen, and may cause the first screen mirrored to the external device to be displayed in the landscape state after the rotatable display of the external device in a portrait state is rotated to the landscape state and when the rotatable display of the external device is in the portrait state and the width of the first screen is greater than the height of the first screen.

The information on the resolution may cause the first screen mirrored to the external device to be displayed on the rotatable display of the external device in a portrait state when the rotatable display of the external device is in the portrait state and a height of the first screen is greater than a width of the first screen, and may cause the first screen mirrored to the external device to be displayed in a landscape state after the rotatable display of the external device in the landscape state is rotated to the portrait state and when the rotatable display of the external device is in the landscape state and the height of the first screen is greater than the width of the first screen.

The method may further include reducing a size of the first screen displayed on the display and provided by the first application, based on the mirroring of the first screen to the external device.

The method may further include enlarging a size of the second screen that is not mirrored so that the second screen is displayed on at least a portion of an area where the first screen was displayed on the display before the reducing, based on the reducing the size of the screen.

The method may further include, based on the mirroring of the first screen, displaying the first screen on the display to be darker than before the mirroring.

The method may further include replacing, on the display, the first screen with information on an image included in the first screen mirrored to the external device.

The method may further include; displaying a menu for setting a mirroring area on the display, based on a signal for mirroring an external device screen being received from the external device in a state in which the second screen provided by the second application is displayed on the display; and displaying the external device screen mirrored from the external device on a first area and displaying the second screen provided by the second application on a second area different from the first area, based on the first area being set as the mirroring area according to a user command for manipulating the menu.

According to another aspect of the disclosure, an electronic device includes: a memory storing instructions; and a processor configured to execute the instructions to: based on a user command for selectively mirroring one of a plurality of screens being received in a state in which the plurality of screens are displayed, control to provide a first screen, from among the plurality of screens, to an external device for mirroring, and control to display a second screen that is not mirrored to the external device, while mirroring the first screen to the external device.

The processor may be further configured to execute the instructions to control the first screen mirrored, to the external device, based on another user command received while the first screen is being mirrored to the external device.

The first screen may be provided by a first application, and the second screen is provided by a second application different from the first application.

The first screen and the second screen may be provided by a same application.

The processor may be further configured to execute the instructions to control to reduce a size of the first screen displayed on a display of the electronic device, based on the mirroring of the first screen to the external device.

The processor may be further configured to execute the instructions to control to enlarge a size of the second screen that is not mirrored so that the second screen that is not mirrored is displayed on at least a portion of an area where the first screen was displayed on the display before being reduced, based on the reducing of the size of the first screen.

The processor may be further configured to execute the instructions to control to display the first screen on a display of the electronic device to be darker than before the mirroring.

The processor may be further configured to execute the instructions to control to replace, on a display of the electronic device, the first screen with information on an image included in the first screen mirrored to the external device.

According to another aspect of the disclosure, a non-transitory computer-readable recording medium has recorded thereon instructions executable by at least one processor to perform the method.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

First, terms in the specification and claims are used in consideration of functions, operations, and structures described in the disclosure. However, these terms may vary depending on the intentions of those skilled in the art, legal or technical interpretation, and emergence of new technologies. In addition, some terms are arbitrarily chosen by the applicant. These terms may be interpreted by the meanings defined herein, and/or may be interpreted based on the general contents of the specification and common technical knowledge in the related art, unless otherwise defined.

It is understood that, hereinafter, expressions such as "at least one of," when preceding a list of elements (e.g., "at least one of A and B" or "at least one of A or B"), modify the entire list of elements (i.e., only A, only B, or both A and B) and do not modify the individual elements of the list Also, when a detailed description for a known function or configuration related to the disclosure may unnecessarily obscure the gist of the disclosure, the detailed description thereof will be abbreviated or omitted.

Further, one or more embodiments will hereinafter be described in detail with reference to the accompanying drawings and the contents described in the accompanying drawings, but the disclosure is not limited to or limited by these embodiments.

Hereinafter, one or more embodiments will be described in detail with reference to the accompanying drawings.

Figure 1:
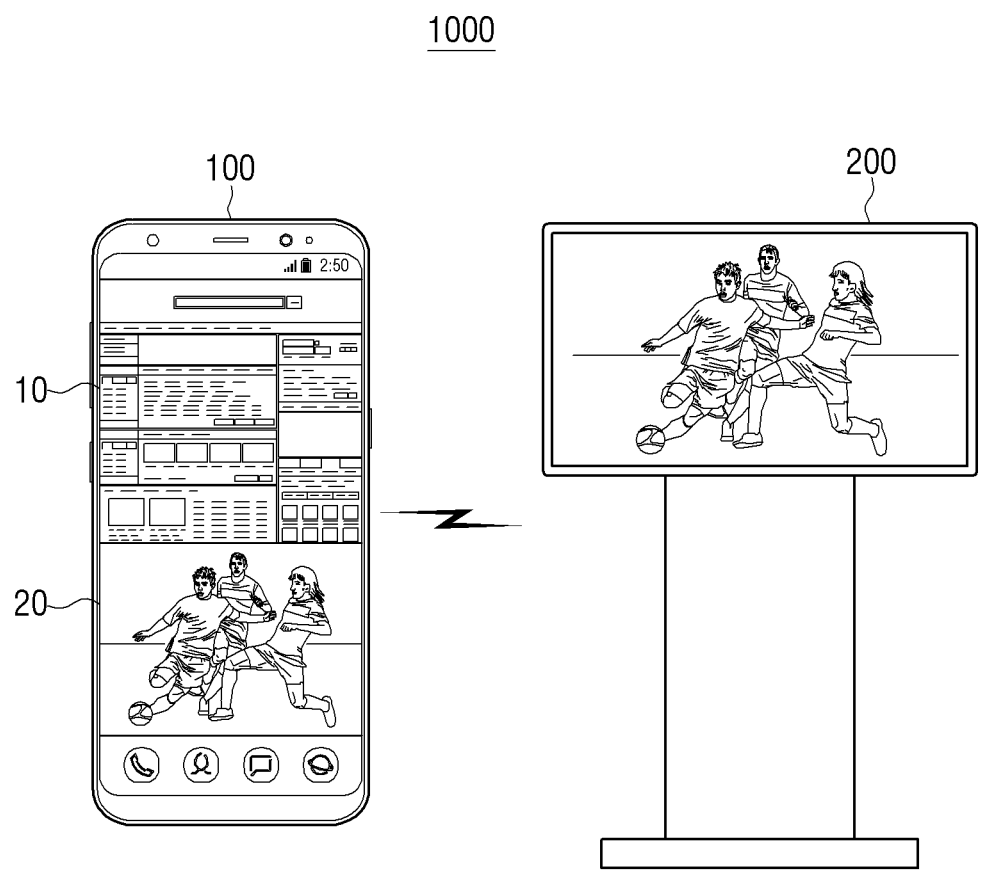
FIG. 1 is a diagram illustrating a mirroring system according to an embodiment.

FIG. 1 is a diagram illustrating a mirroring system 1000 according to an embodiment.

A mirroring system 1000 according to an embodiment includes an electronic device 100 and an external device 200.

Referring to FIG. 1, the electronic device 100 according to an embodiment may be a smartphone. However, this is merely one example, and the electronic device 100 may be various electronic devices including a display, such as a computer, a notebook, a tablet, a digital camera, a camcorder, a personal digital assistant (PDA), a smart television (TV), and the like.

The electronic device 100 may display a plurality of screens provided by a plurality of applications. To this end, the electronic device 100 may be implemented as a device supporting a multi-task operation.

Specifically, the electronic device 100 may display a screen provided by a first application on a first area of the display and a screen provided by a second application on a second area of the display according to a user command. As an example, referring to FIG. 1, the electronic device 100 may display a screen 10 provided by an application providing a portal service on the first area of the display and display a screen 20 provided by a video application on the second area of the display. It is understood that, while FIG. 1 illustrates two screens provided by two applications, this is merely one example and the electronic device 100 may also display a plurality of screens provided by three or more applications. In addition, locations where the plurality of screens provided by the plurality of applications are displayed may be variously set or changed according to a user command.

Hereinafter, for convenience of explanation, an application that provides a screen displayed on the first area of the display of the electronic device 100 is called a first application, and an application that provides a screen displayed on the second area of the display of the electronic device 100 is called a second application.

The electronic device 100 may selectively mirror one screen among the plurality of screens provided by the plurality of applications to the external device 200.

Specifically, when a user command for mirroring one of the plurality of screens is input in a state in which the plurality of screens provided by the plurality of applications are displayed (e.g., simultaneously displayed) on the display, the electronic device 100 may mirror a screen provided by an application corresponding to a user command or user selection to the external device 200. That is, the electronic device 100 may mirror the screen provided by the application corresponding to the user command, not the entirety of the screen itself displayed on all of the display, to the external device 200.

As an example, as illustrated in FIG. 1, when a user command for mirroring a screen 20 provided by a second application is input in a state in which a screen 10 provided by a first application is displayed on the first area of the display of the electronic device 100 and the screen 20 provided by the second application is displayed on the second area of the display of the electronic device 100, the electronic device 100 may mirror the screen 20 provided by the second application to the external device 200 (without mirroring the screen 10 provided by the first application).

Accordingly, the screen 20 provided by the second application may be displayed on the display of the external device 200.

The external device 200, which is a device that may communicate with the electronic device 100, may be implemented as a smart TV, but is not necessarily limited thereto. For example, the external device 200 may be various electronic devices including a display or outputting an image for display on an external display, such as a computer, a notebook, a tablet, a digital camera, a camcorder, a personal digital assistant (PDA), a smartphone, a set-top box, a video receiver, an image processor, a projector, and the like.

The electronic device 100 may display the screen 10 which is not mirrored to the external device 200 and is provided by the first application on the display of the electronic device 100, while mirroring the screen 20 provided by the second application to the external device 200. In addition, when a user command for the first application is input to the electronic device 100, the electronic device 100 may display the screen 10 provided by the first application based on the user command on the display of the electronic device 100.

Specifically, when the user command for the first application is input while the electronic device 100 mirrors the screen 20 provided by the second application to the external device 200, the electronic device 100 may display the screen 10 provided by the first application based on the user command on the first area while continuously mirroring the screen 20 provided by the second application to the external device 200. For example, as illustrated in FIG. 1, when a user command for searching for content is input through the screen 10 provided by an application providing a portal service displayed on the first area, while mirroring the screen 20 provided by a video application displayed on the second area to the external device 200, the electronic device 100 may display a screen 10 including the content searched by the application providing the portal service based on the user command on the first area while continuously mirroring the screen 20 provided by the video application to the external device 200.

Accordingly, the user may receive various services provided by the first application through the electronic device 100 while watching the screen 20 provided by the second application through the external device 200.

Figure 2:
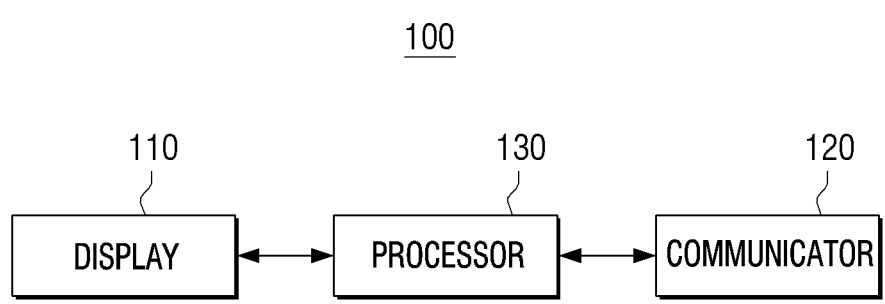
FIG. 2 is a block diagram illustrating an electronic device according to an embodiment.

FIG. 2 is a block diagram illustrating an electronic device 100 according to an embodiment.

Referring to FIG. 2, the electronic device 100 according to an embodiment includes a display 110, a communicator 120, and a processor 130.

The display 110 may display various screens (e.g., simultaneously display various screens on different areas of the display 110). As an example, the display 110 may display various screens provided by an application. In addition, the display 110 may also display a plurality of screens provided by a plurality of applications through a multi-task function.

Furthermore, the display 110 may display various user interfaces (UIs) and icons, as well as various images such as broadcast contents and multimedia contents.

The display 110 may be implemented in various manners, such as a liquid crystal display (LCD) panel, a light emitting diode (LED) display or backlit display, an organic light emitting diode (OLED) display, a liquid crystal on silicon (LCoS) display, a digital light processing (DLP) display, etc. In addition, the display 110 may also include a driving circuit, a backlight unit, and the like, which may be implemented in the form of an a-Si thin-film-transistor (TFT), a low temperature poly silicon (LTPS) TFT, an organic TFT (OTFT), and the like.

On the other hand, the display 110 may be combined with a touch sensor and implemented as a touch screen. Here, the touch screen may detect a touch input through various methods such as capacitive overlay, pressure, resistive overlay, infrared beam, etc.

The communicator 120 may communicate with an external device 200 to transmit and receive various data.

For example, the communicator 120 may communicate with the external device 200 through a local area network (LAN), an Internet network, a mobile communication network, and/or various communication methods such as Bluetooth (BT), Bluetooth Low Energy (BLE), Wireless Fidelity (WI-FI), Wireless Fidelity Direct (WI-FI Direct), Zigbee, NFC, and the like. To this end, the communicator 120 may include various communication modules for performing network communication. For example, the communicator 120 may include at least one of a Bluetooth chip, a Wi-Fi chip, a wireless communication chip, and the like.

In addition, the communicator 120 may be connected to the external device 200 through a high definition multimedia interface (HDMI), a digital visual interface (DVI), or the like to communicate with the external device 200.

The communicator 120 may communicate with the external device 200 to mirror the screen provided by an application of the electronic device 100 to the external device 200. Here, the object to be mirrored may include not only the screen provided by the application, but also audio provided by the application.

In addition, the communicator 120 may communicate with the external device 200 to transmit and receive a control command to/from the external device 200. Here, the control command may be a user command input to the electronic device 100 to control the external device 200. Alternatively, the control command may be a user command input to the external device 200 to manipulate the application of the electronic device 100. In this case, the screen provided by the application of the electronic device 100 based on the control command received from the external device 200 may be displayed on the electronic device 100.

The processor 130 (e.g., at least one processor) controls an overall operation of the electronic device 100. To this end, the processor 130 may include one or more of a central processing unit (CPU), an application processor (AP), and a communication processor (CP).

The processor 130 may drive an operating system and/or an application program to control hardware and/or software components connected to the processor 130 and perform various kinds of data processing and calculation. In addition, the processor 130 may load a command or data received from at least one of other components on a volatile memory to process the command or data, and store various kinds of data in a non-volatile memory.

Hereinafter, for convenience of explanation, an operation of the processor 130 according to one or more embodiments will be described with reference to FIGS. 3 to 13.

The processor 130 may display a plurality of screens provided by a plurality of applications. Specifically, the processor 130 may display a screen 10 provided by a first application on a first area of the display 110 and a screen 20 provided by a second application on a second area of the display 110 based on a user command for executing a multi-task function.

Figure 3:
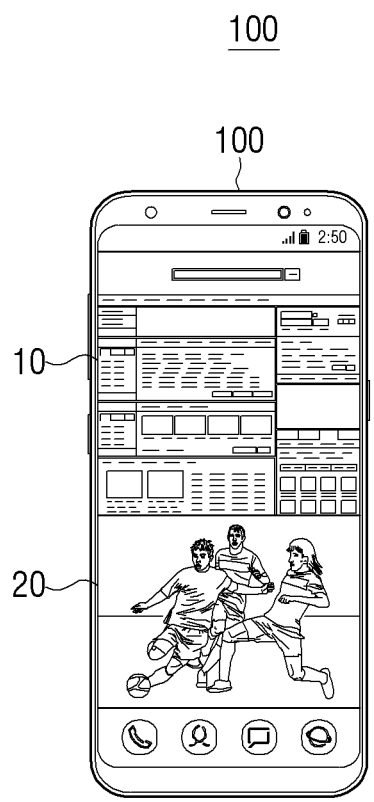
FIG. 3 is a diagram illustrating a plurality of screens provided by a plurality of applications according to an embodiment.

As an example, referring to FIG. 3, the processor 130 may display a screen 10 provided by an application providing a portal service on the first area of the display 110 and display a screen 20 provided by a video application on the second area of the display 110. Alternatively, the processor 130 may display the screen 10 provided by the application providing the portal service on a background area and also display the screen 20 provided by the video application by overlapping the background area in a pop-up form (e.g., a portion of the screen 10 is overlapped by the screen 20).

The processor 130 may selectively mirror one screen among the plurality of screens provided by the plurality of applications to the external device 200. Specifically, when a user command for mirroring one of the plurality of screens is input in a state in which the plurality of screens provided by the plurality of applications are displayed on the display 110, the processor 130 may control the communicator 120 to mirror a screen provided by an application corresponding to the user command to the external device 200.

Figure 4:
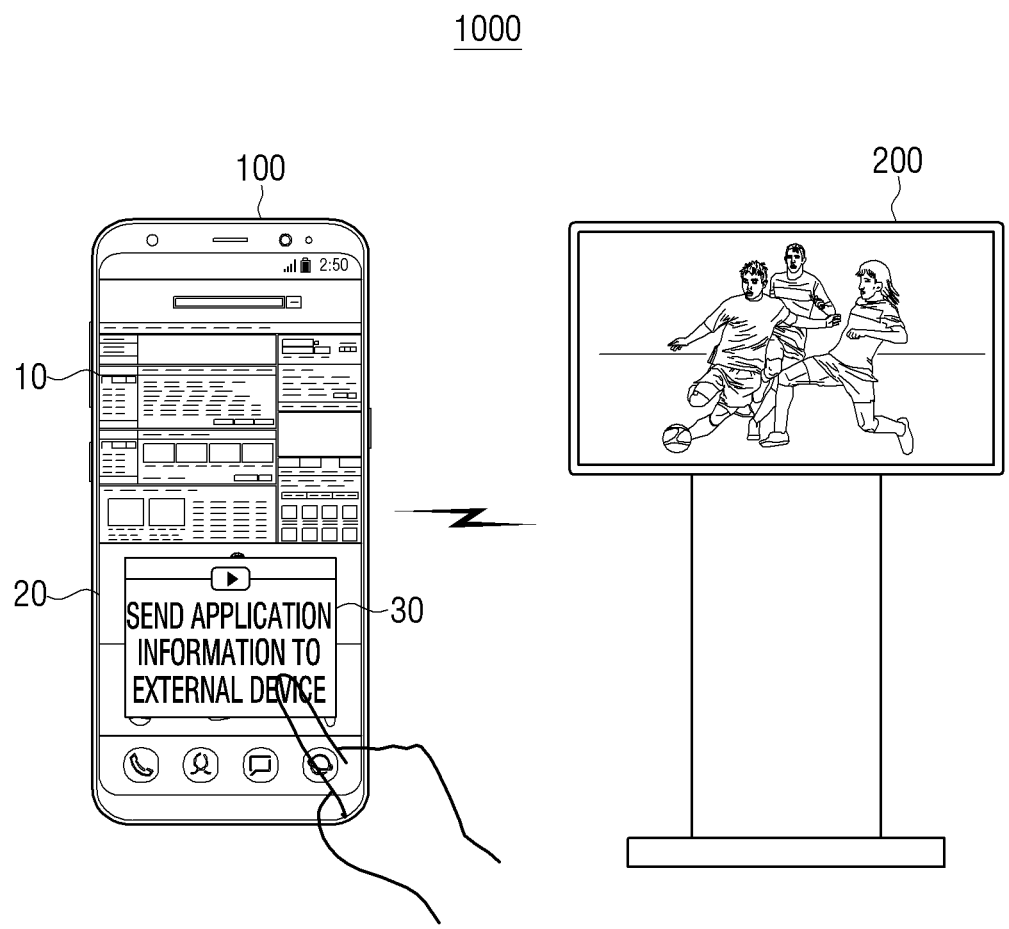
FIG. 4 is a diagram illustrating an example of mirroring one screen of the plurality of screens to an external device according to an embodiment.

As an example, as illustrated in FIG. 4, when a user command of selecting the screen 20 provided by the second application is input in a state in which the screen 10 provided by the first application is displayed on the first area of the display 110 of the electronic device 100 and the screen 20 provided by the second application is displayed on the second area of the display 110 of the electronic device 100, the processor 130 may display a menu 30 related to the selected second application. Here, the selection may be a user input of touching the screen 20 provided by the application for a predetermined time or more, and a user input of touching a menu related to an environment setting of the application.

In addition, when a user command of selecting a menu for mirroring the screen 20 provided by the second application among the option(s) or selectable item(s) included in the menu 30 related to the second application is input, the processor 130 may mirror the screen 20 provided by the second application to the external device 200.

Specifically, when a user command for mirroring is input, the processor 130 may encode a screen provided by an application corresponding to the user command in real time, and control the communicator 120 to transmit the encoded data to the external device 200.

Accordingly, the screen 20 provided by the second application may be displayed on a display of the external device 200. That is, as illustrated in FIG. 4, the external device 200 may display the screen 20 provided by the second application received from the electronic device 100, not the entirety of the screen itself displayed on the entire display of the electronic device 100.

Meanwhile, the processor 130 may display (i.e., control to display) the screen 10 which is not mirrored to the external device 200 and provided by the first application on the display 110, while mirroring the screen 20 provided by the second application to the external device 200. In addition, when a user command for the first application displayed on the display 110 is input, the processor 130 may display a screen 10 provided by the first application based on the user command on the display.

Specifically, when the user command for the first application is input while the processor 130 mirrors the screen 20 provided by the second application to the external device 200, the processor 130 may display the screen 10 provided by the first application based on the user command on the first area while continuously mirroring the screen 20 provided by the second application to the external device 200.

Figure 5:
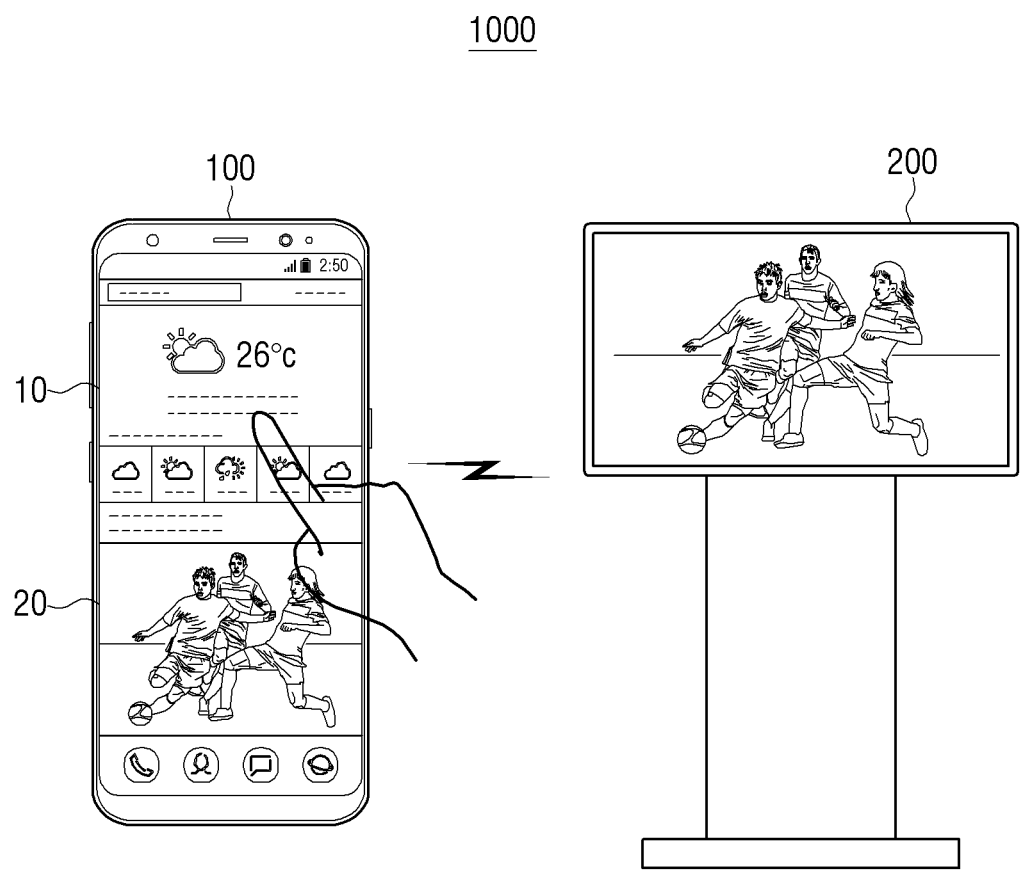
FIG. 5 is a diagram illustrating an example of manipulating an un-mirrored screen of the plurality of screens according to an embodiment.

For example, referring to FIG. 5, when a user command for searching for the weather is input through the screen 10 provided by an application providing a portal service displayed on the first area of the display 110, while mirroring the screen 20 provided by a video application displayed on the second area of the display 110 to the external device 200, the processor 130 may display a screen 10 including the weather information searched by the application providing the portal service based on the user command on the first area while continuously mirroring the screen 20 provided by the video application to the external device 200.

Accordingly, the user may receive various services provided by the first application through the electronic device 100 while watching the screen 20 provided by the second application through the external device 200.

On the other hand, when a user command for the second application is input (e.g., to the electronic device 100 or to the external device 200) while the processor 130 mirrors the screen 20 provided by the second application to the external device 200, the processor 130 may control the communicator 120 to mirror, to the external device 200, the screen 20 provided by the second application based on the user command.

That is, when a user command for the first application which is not mirrored is input, the processor 130 may display the screen 10 provided by the first application based on the user command on the first area while continuously mirroring the screen 20 provided by the second application to the external device 200. When (or based on) a user command for the second application, which is mirrored, being input, the processor 130 may mirror to the external device 200 the screen 20 provided by the second application based on the user command.

Figure 6:
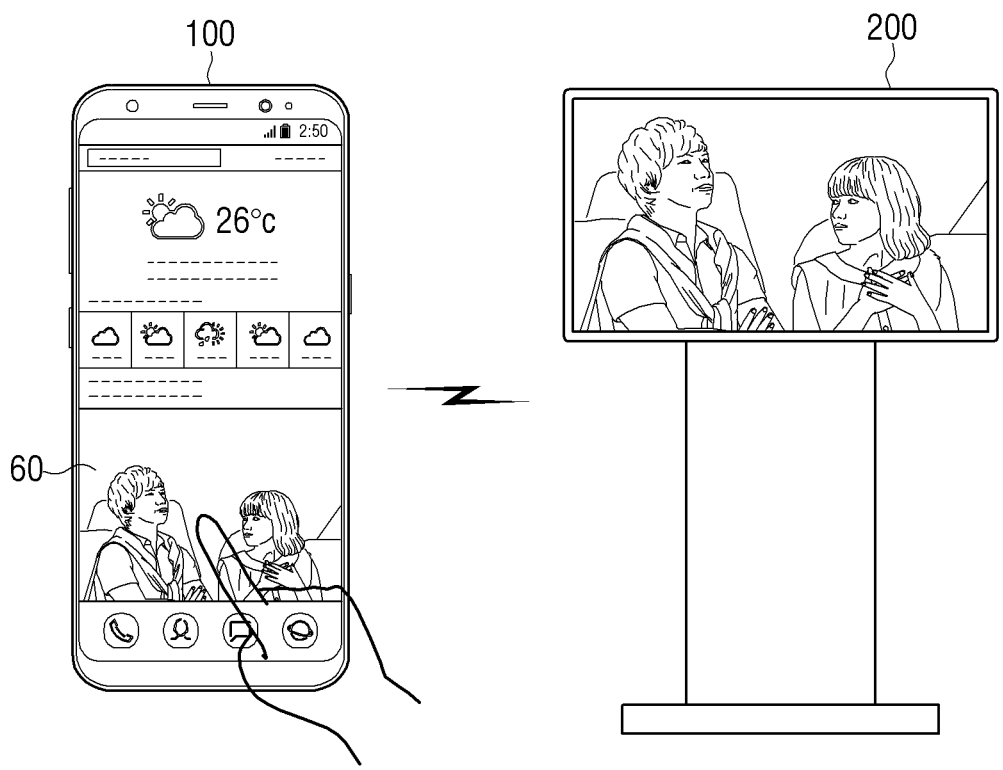
FIG. 6 is a diagram illustrating an example of manipulating a mirrored screen of the plurality of screens according to an embodiment.

For example, as illustrated in FIG. 6, when a user command for playing another image is input through the video application while the processor 130 mirrors the screen 20 provided by the video application to the external device 200, the processor 130 may mirror, to the external device 200, a new image 60 displayed according to the user command.

Accordingly, the user may mirror an image that the user wants to watch through the second application to the external device 200 while searching for the content through the first application.

Furthermore, when a user command for mirroring one of the plurality of screens displayed on the display 110 is input, the processor 130 may control the communicator 120 to transmit information on a resolution of a screen provided by an application corresponding to the user command to the external device 200.

That is, the processor 130 may transmit information on a resolution of the screen for mirroring to the external device 200, not a resolution of the entire screen displayed on the display 110.

Specifically, when the user command for mirroring one of the plurality of screens displayed on the display 110 is input, the processor 130 may identify the resolution of the screen provided by the application corresponding to the user command based on resolution information included in image data provided by the application corresponding to the user command, and transmit information on the identified resolution to the external device 200.

Here, the information on the resolution may be used to determine an arrangement state of the display of the external device 200.

Figure 7:
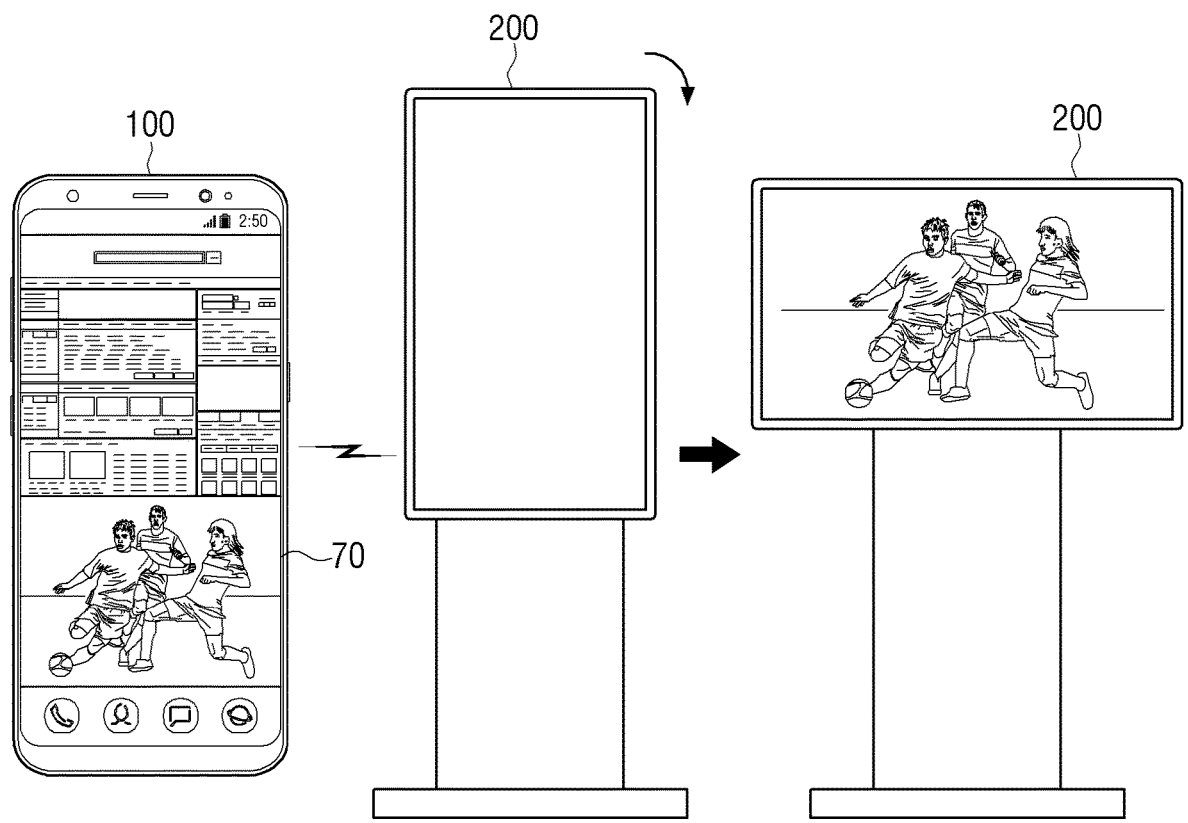
FIG. 7 is a diagram illustrating an example in which a display of an external device is rotated in a landscape state according to an embodiment.

Specifically, as illustrated in FIG. 7, the external device 200 may be implemented as a display device having a rotatable display. In addition, the external device 200 may identify a ratio of the width and the height of the mirrored screen based on the information on the resolution.

For example, when a screen 70 having a width that is longer (greater) than the height is mirrored from the electronic device 100 to the external device 200, in a state in which the display of the external device 200 is in a portrait position, the external device 200 may rotate the display of the external device 200 in the portrait state into a landscape state and then display a mirrored image through the display in the landscape state.

Figure 8:
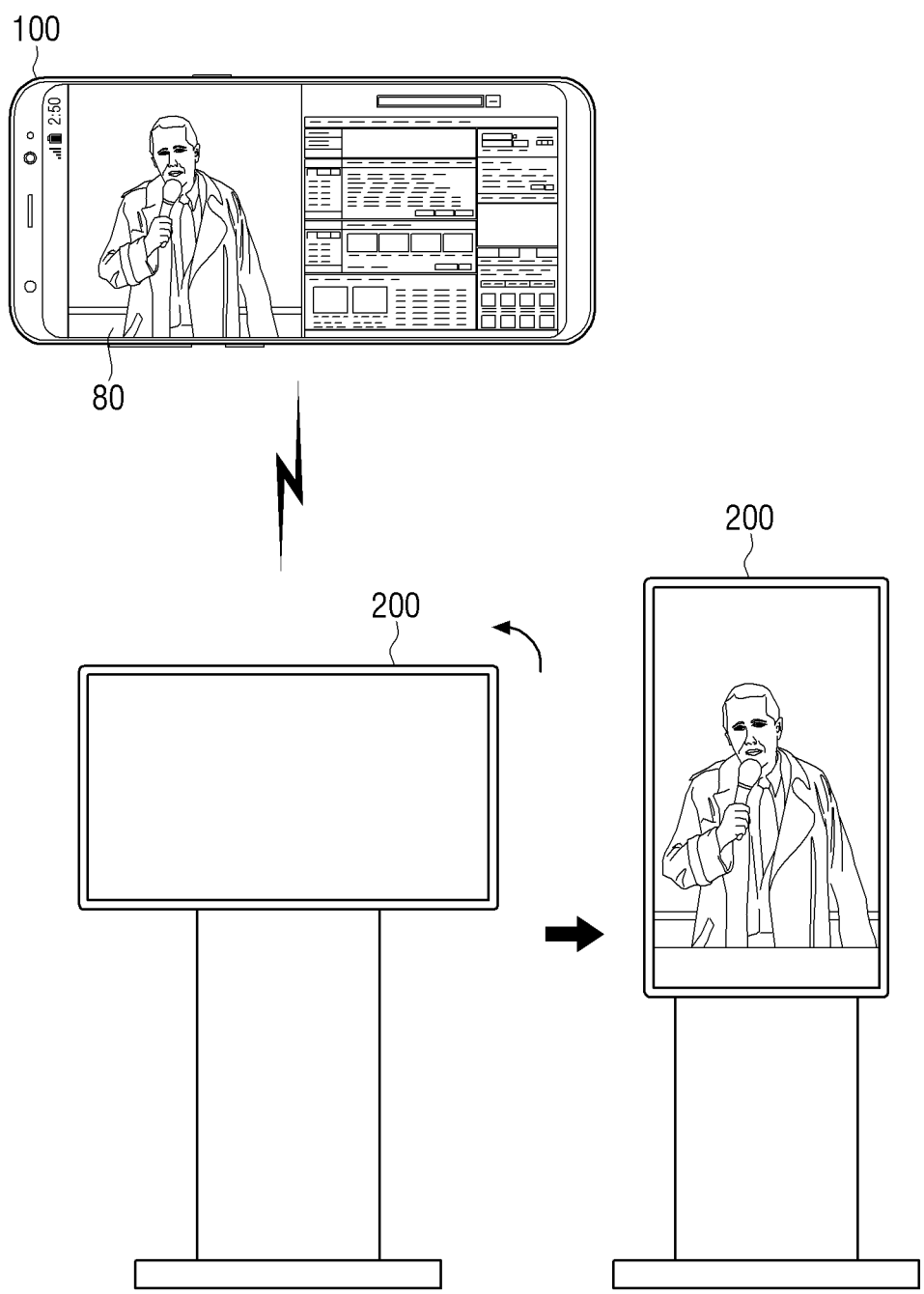
FIG. 8 is a diagram illustrating an example in which the display of the external device is rotated in a portrait state according to an embodiment.

Alternatively, as illustrated in FIG. 8, when (e.g., based on) a screen 80 having a height that is longer (greater) than the width is mirrored from the electronic device 100 to the external device 200, in a state in which the display of the external device 200 is in a landscape position, the external device 200 may rotate the display of the external device 200 in the landscape state into a portrait state and then display a mirrored image through the display in the portrait state.

It is understood that, while it is described that the external device 200 identifies the ratio of the width and the height of the mirrored screen based on the information on the resolution and rotates the display of the external device 200 based on the identified result, this is merely one example and one or more other embodiments are not limited thereto.

For example, according to another embodiment, the processor 130 may identify the ratio of the width and height of the mirrored screen based on the information on the resolution. In this case, based on identifying that the width of the mirrored screen is longer (greater) than the height thereof, the processor 130 may transmit a signal requesting to rotate the display of the external device 200 in the landscape state to the external device 200. Alternatively, the processor 130 may identify the ratio of the width and height of the mirrored screen according to the information on the resolution, and based on identifying that the height of the mirrored screen is longer (greater) than the width thereof, the processor 130 may transmit a signal requesting to rotate the display of the external device 200 in the portrait state to the external device 200.

Accordingly, the user may watch the mirrored screen through the entire screen of the external device 200.

According to an embodiment, the processor 130 may reduce the mirrored screen and display the reduced screen on the display 110.

Specifically, when a user command for mirroring one of the plurality of screens is input, the processor 130 may control the communicator 120 to mirror a screen provided by an application corresponding to the user command to the external device 200 and reduce a size of the screen displayed on the display 110 and provided by the application.

As a result, hardware resources of the electronic device 100 can be more efficiently used and an interface of the electronic device 100 is improved, as the user watches the image through the external device 200 and no longer watches the image through the electronic device 100. That is, a display area of the electronic device 100 and attendant resources for the display area are not wasted for content that the user will view primarily on the external device 200.

Figure 9:
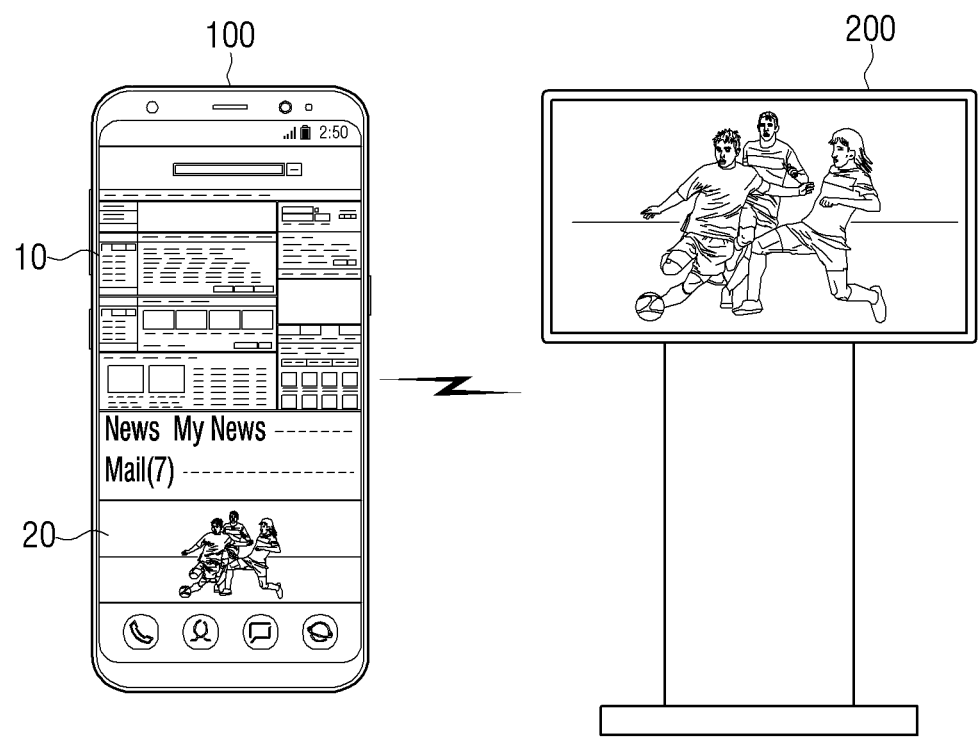
FIG. 9 is a diagram illustrating an example in which a mirrored screen is reduced according to an embodiment.

For example, referring to FIG. 9, when a user command for mirroring the screen 20 provided by the second application is input, the processor 130 may mirror the screen 20 provided by the second application to the external device 200 and reduce a size of the screen 20 provided by the second application displayed on the display 110.

At the same time, the processor 130 may enlarge and display the screen 10 provided by the first application based on the reduction in the size of the screen 20 provided by the second application.

Specifically, the processor 130 may enlarge a size of the screen 10 provided by the first application so that the screen 10 provided by the first application is displayed on at least a portion of the area where the reduced image is displayed on the display 110 before the reduction, based on the reduction in the size of the screen 20 provided by the second application.

Accordingly, more information may be displayed on the screen 10 provided by the first application. As illustrated in FIG. 9, when the first application is an application providing a portal service, news content, mail content, and the like may be further displayed on the screen 10 provided by the first application.

According to another embodiment, when a user command for mirroring one of the plurality of screens is input, the processor 130 may control the communicator 120 to mirror a screen provided by an application corresponding to the user command to the external device 200, and display the screen displayed on the display 110 and provided by the application to be darker and/or utilize less resources (e.g., power required for brighter display) than before mirroring.

Specifically, when the user command for mirroring one of the plurality of screens is input, the processor 130 may encode the screen provided by the application corresponding to the user command and mirror the screen to the external device 200, and may further perform dim processing on the screen displayed on the display 110 to dim the brightness of the screen.

When the screen is mirrored, the user generally watches the image through the external device 200 and no longer watches the image through the electronic device 100. Thus, dimming the mirrored screen on the electronic device 100 increases user convenience and reduces resource consumption by the electronic device 100.

Figure 10:
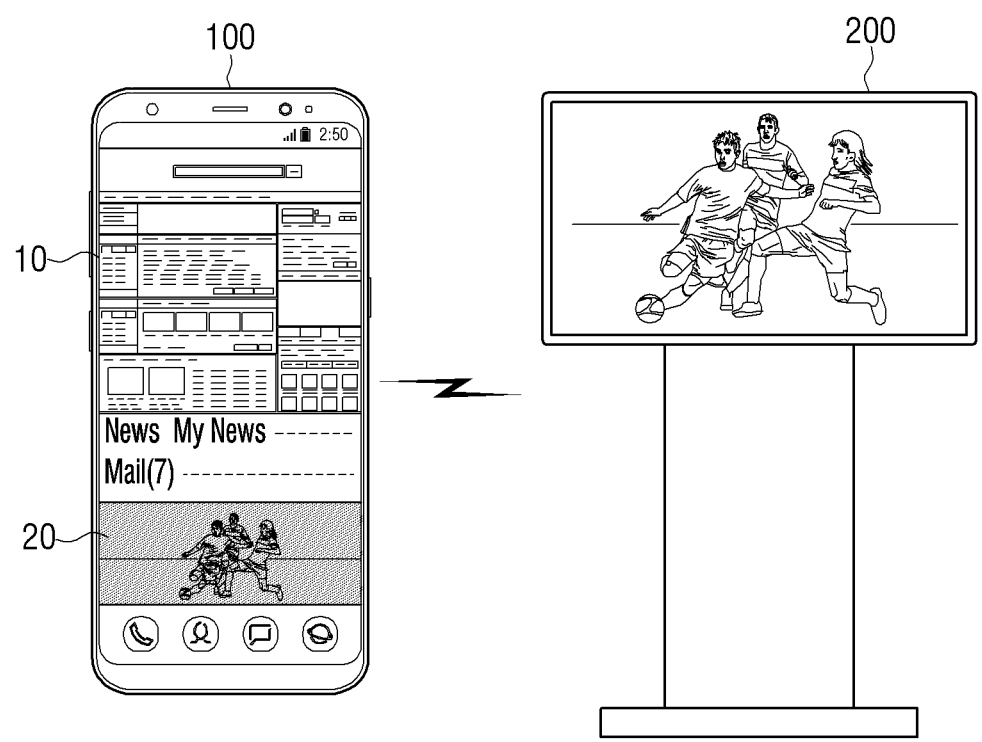
FIG. 10 is a diagram illustrating an example of adjusting brightness of the mirrored screen according to an embodiment.

For example, referring to FIG. 10, the processor 130 may further perform the dim processing on the mirrored screen 20 provided by the second application to display the screen 20 provided by the second application displayed on the display 110 to be darker than the screen 20 before mirroring.

As such, by displaying the mirrored screen 20 provided by the application to be darkened, the user may concentrate on a screen 10 provided by a non-mirrored application.

It is understood that, while FIG. 10 illustrates that the screen 20 provided by the second application is both reduced and darkened, one or more other embodiments are not limited thereto. For example, according to another embodiment, only the dim processing on the screen 10 provided by the second application may be performed without the reduction.

Furthermore, when (e.g., based on) the user command for mirroring one of the plurality of screens is input, the processor 130 may control the communicator 120 to mirror a screen provided by an application corresponding to the user command to the external device 200 and display information on an image mirrored to the external device 200 on the screen displayed on the display 110 and provided by the application corresponding to the user command.

Specifically, when the user command for mirroring one of the plurality of screens is input, the processor 130 may encode the screen provided by the application corresponding to the user command and mirror the screen to the external device 200, and may not display the screen provided by the application corresponding to the user command on the display 110. That is, the processor 130 may control the communicator 120 to mirror the screen provided by the application corresponding to the user command to the external device 200, and may control the display 110 so as not to display the screen provided by the application corresponding to the user command.

In addition, the processor 130 may display information on a mirrored image on the screen provided by the application corresponding to the user command, based on information on an image included in image data provided by the application corresponding to the user command.

Figure 11:
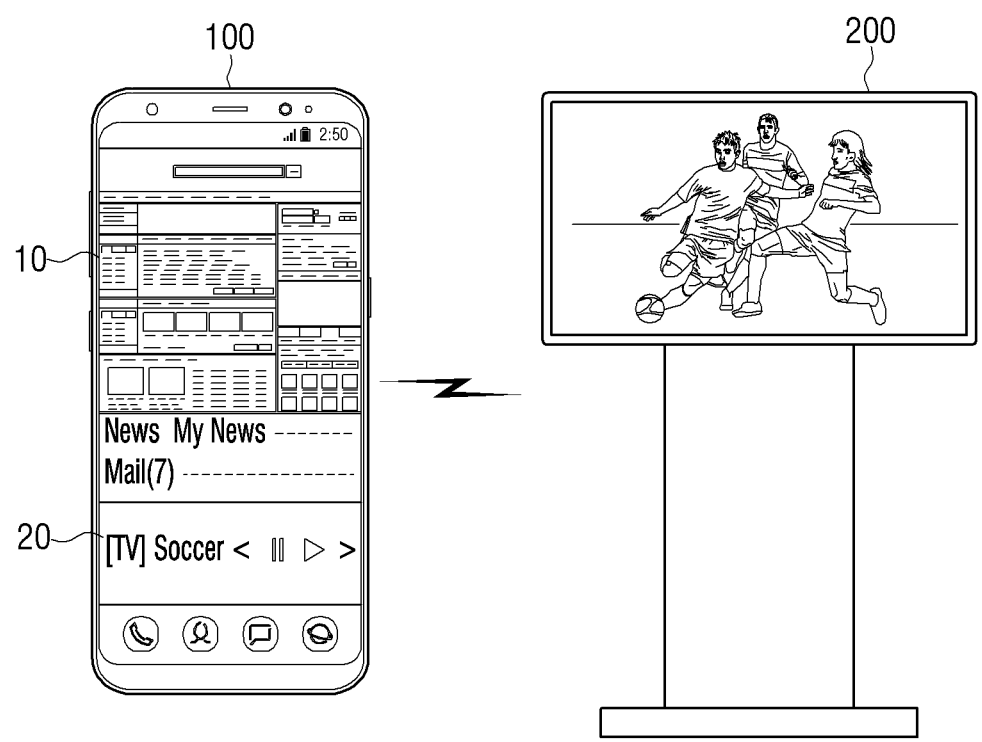
FIG. 11 is a diagram illustrating an example of displaying information on an image in an area where the mirrored screen is displayed, according to an embodiment.

For example, as illustrated in FIG. 11, when it is identified (e.g., determined) that the screen provided by the second application is an image related to soccer, based on information on the image, the processor 130 may display information indicating that the mirrored image is an image related to soccer on the second area.

In addition, as illustrated in FIG. 11, the processor 130 may display a screen that further includes a menu for controlling the image, in addition to the information on the image on the second area.

According to one or more embodiments, the processor 130 may display a screen further including at least one of a menu for controlling the image or a reduced image of the screen provided by the application corresponding to the user command, in addition to the information on the image, on the second area.

Accordingly, the user may easily check information on an image currently being mirrored, and may easily control the image being mirrored.

The processor 130 may also display an image mirrored from the external device 200.

In this case, when the screen is mirrored from the external device 200, a related art electronic device displays the mirrored screen through the entire screen of the electronic device. That is, while displaying a mirrored image from an external device 200, a related art electronic device does not display a plurality of screens provided by a plurality of applications through multi-tasking.

Conversely, when (e.g., based on) the signal for mirroring is received from the external device 200, the processor 130 of the electronic device 100 according to an embodiment may control to display a menu for setting a mirroring area.

Figure 12:
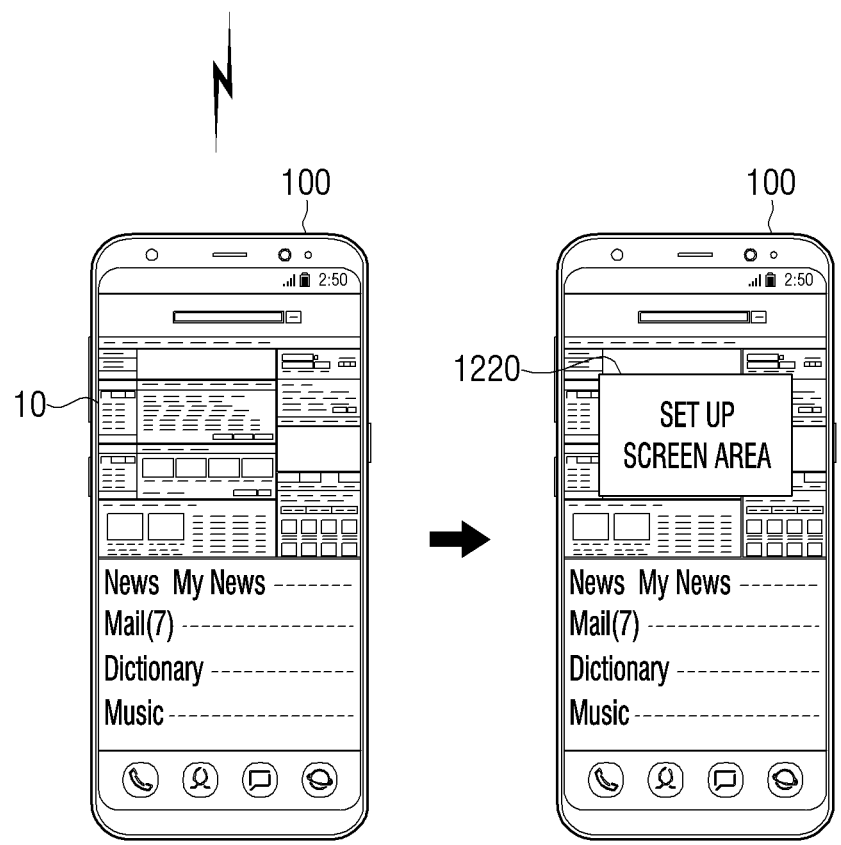
FIG. 12 is a diagram illustrating an example of setting a mirroring area when an external device mirrors a screen to an electronic device according to an embodiment.

For example, referring to FIG. 12, when a signal for mirroring a screen is received from the external device 200 in a state in which the screen 10 provided by the first application is displayed on the display 110, the processor 130 may display a menu 1220 (or graphical user interface (GUI) item, etc.) for setting or selecting a mirroring area.

In this case, when a first area is set as the mirroring area based on a user command for manipulating the menu 1220, the processor 130 may display the screen mirrored from the external device 200 on the first area and display the screen provided by the first application on the second area different from the first area.

Figure 13:
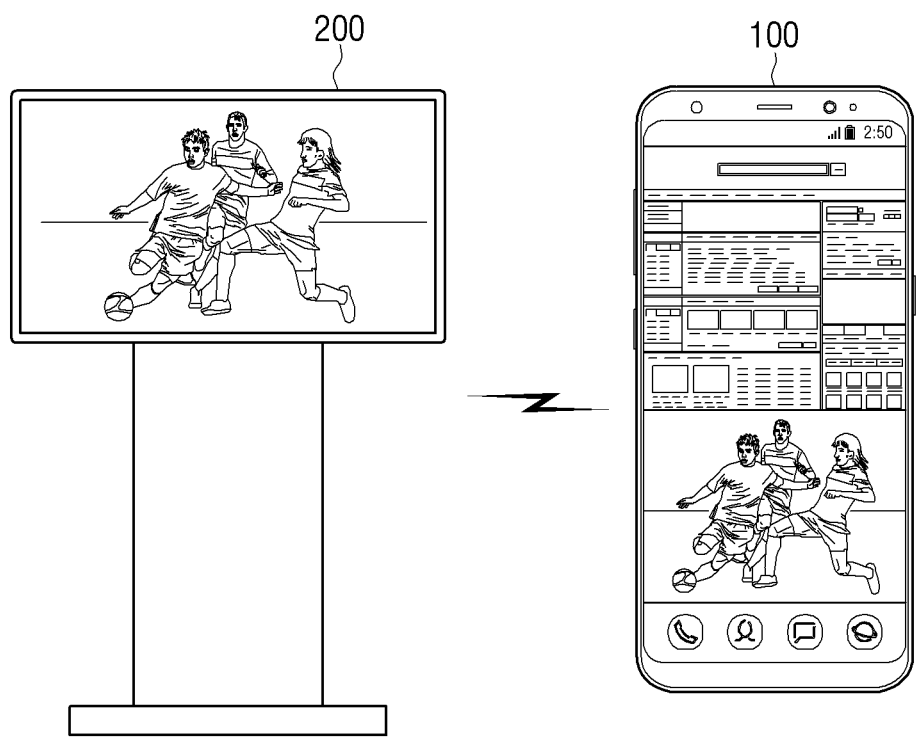
FIG. 13 is a diagram illustrating an example in which an external device mirrors a screen to an electronic device according to an embodiment.

For example, as illustrated in FIG. 13, when a lower end area is set as the mirroring area, the processor 130 may display the screen mirrored from the external device 200 (and, by way of example, provided by a second application) on the lower end area and display the screen 10 provided by the first application on an upper end area.

Thereafter, similarly to the technical idea described above, when a user command for manipulating the first application is input while the processor 130 displays the screen mirrored from the external device 200, the processor 130 may display the screen provided by the first application on the first area based on the user command.

Figure 14:
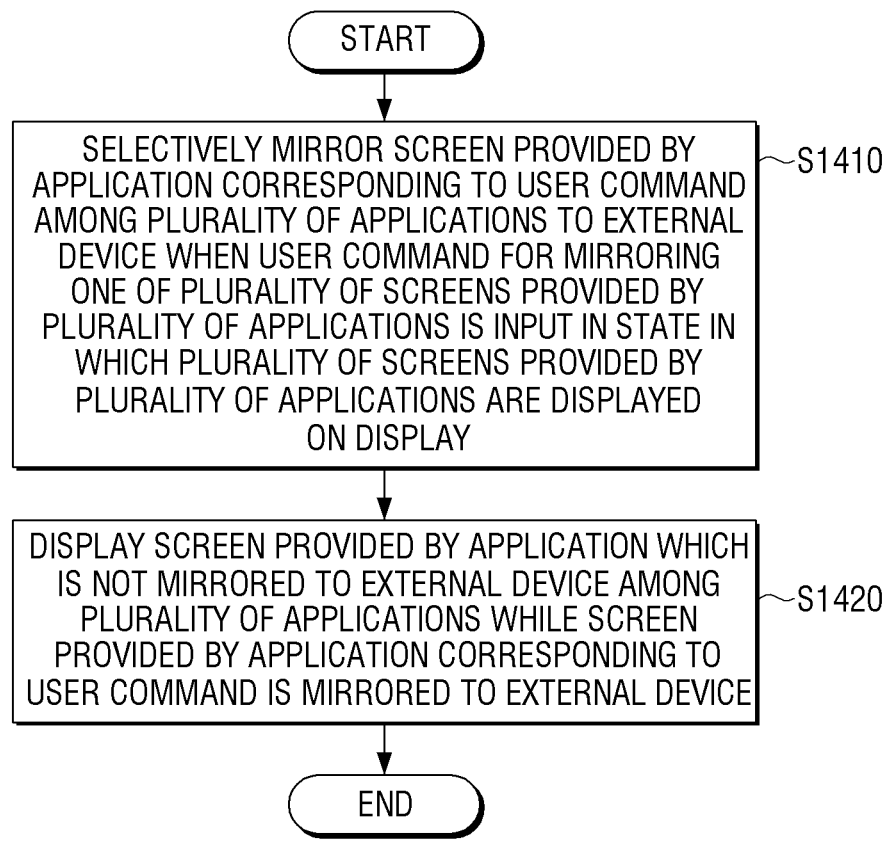
FIG. 14 is a flowchart illustrating a method for controlling an electronic device according to an embodiment.

FIG. 14 is a flowchart illustrating an operation of an electronic device 100 according to an embodiment.

When (e.g., based on) a user command for selectively mirroring one of a plurality of screens provided by an application or a plurality of applications is input in a state in which the plurality of screens are displayed on a display of the electronic device 100, the electronic device 100 may mirror, to an external device 200, a screen provided by an application corresponding to the user command among the plurality of applications (S1410). Here, the mirrored screen may be a screen including a still image, and/or may be a screen including a video.

In addition, the electronic device 100 may display a screen that is not mirrored to the external device 200 (e.g., a screen provided by an application that does not mirror to the external device 200 among the plurality of applications), while mirroring to the external device 200 the screen corresponding to the user command (e.g., a screen provided by an application corresponding to the user command) (S1420).

Accordingly, the user may receive various services by, for example, executing a chatting application through an electronic device 100 such as the smartphone or the like while continuing to watch an image such as a movie through the display of another electronic device 200.

Figure 15:
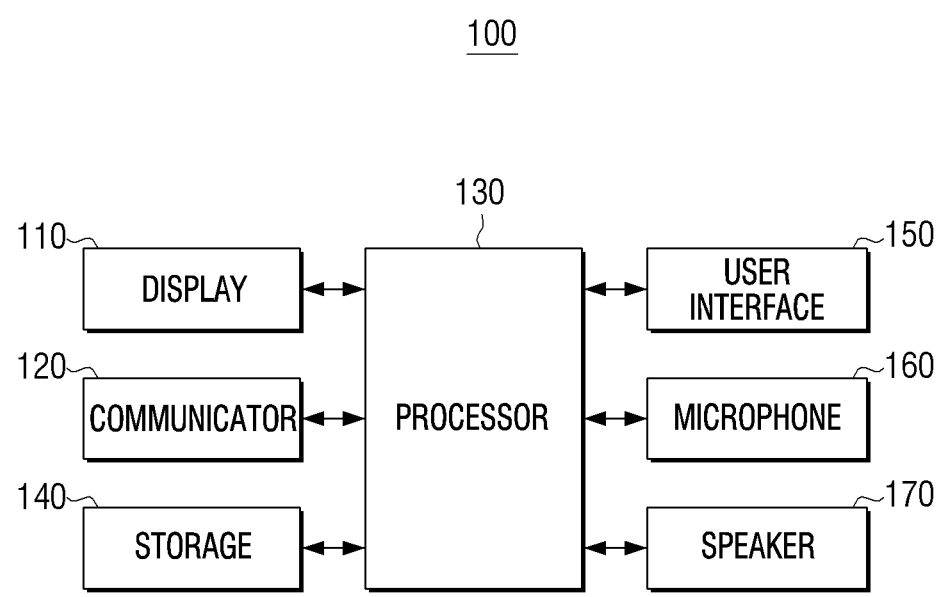
FIG. 15 is a detailed block diagram illustrating the electronic device according to an embodiment.

FIG. 15 is a detailed block diagram illustrating an electronic device 100 according to the embodiment.

Referring to FIG. 15, the electronic apparatus 100 according to an embodiment may include the display 110, the communicator 120, a storage 140, a user interface 150, the processor 130, a microphone 160, and a speaker 170. Hereinafter, descriptions overlapping or substantially redundant with descriptions provided above will be omitted or abbreviated.

The storage 140 may store an operating system (OS) for controlling an overall operation of the components of the electronic device 100, and commands or data associated with the components of the electronic device 100.

Accordingly, the processor 130 may control a number of hardware and/or software components of the electronic device 100 using various types of commands or data stored in the storage 140, may load and process commands or data received from at least one of other components in a volatile memory, and may store various types of data in a non-volatile memory.

The user interface 150 receives various user commands. Specifically, the user interface 150 may receive a user command for various UI screens for controlling functions or operations of the electronic device 100 provided through the display 110. In particular, when the user interface 150 is implemented as the display 110, the user interface 150 may be a touch screen.

The microphone 160 may receive a user speech (e.g., user voice input). Here, the user speech may be a speech for executing or selecting a specific function of the electronic device 100. When a user speech for mirroring is received, the processor 130 may mirror a screen provided by an application to the external device 200.

To this end, when the user speech is received through the microphone 160, the processor 130 may analyze the user speech through a speech to text (STT) algorithm and identify a function corresponding to the user speech.

The speaker 170 may output various audio. For example, the speaker 170 may output audio provided an application. In addition, when a user command for mirroring is input, the speaker 170 may output a predetermined audio signal.

The processor 130 controls an overall operation of the electronic device 100.

The processor 130 may receive a control command from the external device 200 while performing the mirroring to the external device 200. Here, the control command may be a user command input to the external device 200 to manipulate an application of the electronic device 100. In this case, the screen provided by the application of the electronic device 100 based on the control command received from the external device 200 may be displayed on the electronic device 100.

For example, when a control command for manipulating the second application is received from the external device 200 while the screen provided by the first application is displayed on the first area of the display 110, the screen provided by the second application is displayed on the second area of the display 110, and the screen provided by the second application is mirrored to the external device 200, the processor 130 may control to display the screen provided by the second application based on the control command. In addition, the processor 130 may mirror the screen provided by the second application to the external device 200 based on the control command.

It is understood that methods according to one or more embodiments described above may be implemented in the form of software or an application installable on an electronic device and executable by a processor.

In addition, methods according to one or more embodiments described above may be implemented by upgrading software or hardware of an electronic device.

Also, one or more embodiments described above may also be performed through an embedded server included in the electronic device, or a server outside the electronic device.

Furthermore, a non-transitory computer readable medium storing a program or instructions sequentially or at least partially simultaneously performing a method for controlling an electronic device according to one or more embodiments may be provided.

The non-transitory computer readable medium may be a machine readable medium that semi-permanently stores data. Specifically, various applications. programs, and/or processor-executable instructions described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although certain embodiments have been illustrated and described hereinabove, the disclosure is not limited to the specific embodiments described above, but may be variously modified by those skilled in the art to which the disclosure pertains without departing from the scope and spirit of the disclosure as claimed in the claims. These modifications should also be understood to fall within the technical spirit and scope of the disclosure.

What is claimed is:
1. An electronic device comprising:
a display;
a communicator; and
a processor configured to:
control the communicator to mirror, to an external device, a first screen provided by a first application corresponding to a user command, among a plurality of applications providing a plurality of screens, based on the user command for selectively mirroring one of the plurality of screens being input in a state in which the plurality of screens are displayed on the display, and
control the display to display a second screen provided by a second application, that is not mirrored to the external device, among the plurality of applications, while mirroring the first screen provided by the first application to the external device,
wherein the processor is further configured to, based on the user command being input, control the communicator to transmit, to the external device, information on a resolution of the first screen, in order to cause an orientation of a rotatable display of the external device to be arranged based on the information on the resolution.

2. The electronic device as claimed in claim 1, wherein the processor is further configured to control the communicator to mirror, to the external device, a third screen provided by the first application based on another user command received while the first screen is being mirrored to the external device.

3. The electronic device as claimed in claim 1, wherein based on the rotatable display of the external device being in a landscape state and a width of the first screen being greater than a height of the first screen, the information on the resolution causes the first screen mirrored to the external device to be displayed on the rotatable display of the external device in the landscape state, and
wherein based on the rotatable display of the external device being in a portrait state and the width of the first screen being greater than the height of the first screen, the information on the resolution causes the first screen mirrored to the external device to be displayed on the rotatable display of the external device in the landscape state after the rotatable display of the external device in the portrait state is rotated to the landscape state.

4. The electronic device as claimed in claim 1, wherein based on the rotatable display of the external device being in a portrait state and a height of the first screen being greater than a width of the first screen, the information on the resolution causes the first screen mirrored to the external device to be displayed on the rotatable display of the external device in the portrait state, and
wherein based on the rotatable display of the external device being in a landscape state and the height of the first screen being greater than the width of the first screen, the information on the resolution causes the first screen mirrored to the external device to be displayed in the portrait state after the rotatable display of the external device in the landscape state is rotated to the portrait state.

5. The electronic device as claimed in claim 1, wherein the processor is further configured to reduce a size of the first screen displayed on the display based on the mirroring of the first screen to the external device, and to display the first screen of the reduced size on the display.

6. The electronic device as claimed in claim 5, wherein the processor is further configured to enlarge a size of the second screen that is not mirrored so that the second screen is displayed on at least a portion of an area where the first screen was displayed on the display before being reduced, based on the reducing of the size of the first screen.

7. The electronic device as claimed in claim 1, wherein the processor is further configured to display the mirrored first screen on the display to be darker than before the mirroring.

8. The electronic device as claimed in claim 1, wherein the processor is further configured to control to replace, on the display, the first screen with information describing a content of the first screen mirrored to the external device.

9. The electronic device as claimed in claim 1, wherein the processor is further configured to:
display a menu for setting a mirroring area on the display, based on a signal for mirroring an external device screen being received from the external device in a state in which the second screen provided by the second application is displayed on the display; and
display the external device screen mirrored from the external device on a first area and display the second screen provided by the second application on a second area different from the first area, based on the first area being set as the mirroring area according to a user command for manipulating the menu.

10. A method for controlling an electronic device, the method comprising:
mirroring, to an external device, a first screen provided by a first application corresponding to a user command, among a plurality of applications providing a plurality of screens, based on the user command for selectively mirroring one of the plurality of screens being input in a state in which the plurality of screens are displayed on a display; and
displaying a second screen provided by a second application, that is not mirrored to the external device, among the plurality of applications, while mirroring the first screen provided by the first application to the external device,
wherein the method further comprises transmitting, based on the user command being input, information on a resolution of the first screen to the external device, in order to cause an orientation of a rotatable display of the external device to be arranged based on the information on the resolution.

11. The method as claimed in claim 10, further comprising mirroring, to the external device, a third screen provided by the first application based on another user command received while the first screen is being mirrored to the external device.

12. The method as claimed in claim 10, wherein based on the rotatable display of the external device being in a landscape state and a width of the first screen being greater than a height of the first screen, the information on the resolution causes, the information on the resolution causes the first screen mirrored to the external device to be displayed on the rotatable display of the external device in the landscape state, and
wherein based on the rotatable display of the external device being in a portrait state and the width of the first screen being greater than the height of the first screen, the information on the resolution causes the first screen mirrored to the external device to be displayed in the landscape state after the rotatable display of the external device in the portrait state is rotated to the landscape state.

13. The method as claimed in claim 10, wherein based on the rotatable display of the external device being in a portrait state and a height of the first screen being greater than a width of the first screen, the information on the resolution causes the first screen mirrored to the external device to be displayed on the rotatable display of the external device in the portrait state, and
wherein based on the rotatable display of the external device being in a landscape state and the height of the first screen being greater than the width of the first screen, the information on the resolution causes the first screen to be displayed in the portrait state after the rotatable display of the external device in the landscape state is rotated to the portrait state.

14. The method as claimed in claim 10, further comprising reducing a size of the first screen displayed on the display based on the mirroring of the first screen to the external device, and displaying the first screen of the reduced size on the display.

15. The method as claimed in claim 14, further comprising enlarging a size of the second screen that is not mirrored so that the second screen is displayed on at least a portion of an area where the first screen was displayed on the display before the reducing, based on the reducing the size of the first screen.

16. The method as claimed in claim 10, further comprising, display the mirrored first screen on the display to be darker than before the mirroring.

17. The method as claimed in claim 10, further comprising replacing, on the display, the first screen with information describing a content of the first screen mirrored to the external device.

18. A non-transitory computer-readable recording medium having recorded thereon instructions executable by at least one processor to perform the method of claim 10.

* * * * *